(12) United States Patent  Chacón et al.

(10) Patent No.: US 10,733,054 B2
(45) Date of Patent: Aug. 4, 2020

(54) USER ENGAGEMENT AWARE AUTO-RESTART

(71) Applicant: Dropbox, Inc., San Francisco, CA (US)

(72) Inventors: Águeda Anaid Chacón, Oakland, CA (US); Narmada Jayasankar, San Jose, CA (US); Kaitlin Hanss, San Francisco, CA (US); Jonathan Chien, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 16/034,683

(22) Filed: Jul. 13, 2018

(65) Prior Publication Data

US 2018/0322015 A1    Nov. 8, 2018

Related U.S. Application Data

(63) Continuation-in-part of application No. 15/396,279, filed on Dec. 30, 2016.

(51) Int. Cl.
  *G06F 9/44*  (2018.01)
  *G06F 11/14*  (2006.01)
  *G06F 16/27*  (2019.01)

(52) U.S. Cl.
  CPC ......... *G06F 11/1438* (2013.01); *G06F 11/14* (2013.01); *G06F 16/27* (2019.01)

(58) Field of Classification Search
  CPC ....... G06F 11/1438; G06F 11/14; G06F 16/27
  USPC ................................................. 717/100–178
  See application file for complete search history.

(56) References Cited

U.S. PATENT DOCUMENTS

| | | | |
|---|---|---|---|
| 5,349,662 A * | 9/1994 | Johnson ............. | G06F 11/3438 714/E11.192 |
| 8,583,103 B2 | 11/2013 | Avadhanam | |
| 9,508,040 B2 | 11/2016 | Bilal et al. | |
| 9,569,426 B1 | 2/2017 | Bostick et al. | |
| 2002/0056011 A1 * | 5/2002 | Nardone .................. | G06F 9/44 709/248 |
| 2002/0069282 A1 | 6/2002 | Reisman | |
| 2006/0123428 A1 * | 6/2006 | Burns .................... | G06F 21/34 719/318 |
| 2006/0156157 A1 * | 7/2006 | Haselden ............ | G06F 11/0793 714/746 |
| 2007/0214429 A1 | 9/2007 | Lyudovyk et al. | |
| 2011/0113010 A1 * | 5/2011 | Barber ................ | G06F 16/2471 707/610 |
| 2014/0248852 A1 | 9/2014 | Raleigh et al. | |
| 2015/0177938 A1 * | 6/2015 | Kleinpeter ............. | G06F 16/27 715/738 |
| 2015/0373132 A1 * | 12/2015 | Mukherji ............... | H04L 67/10 709/203 |

(Continued)

OTHER PUBLICATIONS

Final Office Action from U.S. Appl. No. 15/396,279, dated Dec. 31, 2019, 33 pages.

*Primary Examiner* — Jae U Jeon
(74) *Attorney, Agent, or Firm* — Polsinelli PC

(57) ABSTRACT

The present technology pertains to a technique for responding to a crash of an application. The technique includes detecting a crash of an application running on the computing system, selecting a crash response for the application based on engagement status information for a flow profile comprising one or more user signals associated with the application, and implementing the instructions of the crash response.

20 Claims, 8 Drawing Sheets

(56) References Cited

U.S. PATENT DOCUMENTS

2016/0048421 A1* 2/2016 Hanson ................ G06Q 30/012
                                                    705/302
2016/0196132 A1   7/2016 Searle et al.
2017/0289240 A1* 10/2017 Ghare ................. H04L 65/4069
2018/0082552 A1*  3/2018 Moussette ................ G08B 6/00

* cited by examiner

USER ENGAGEMENT AWARE AUTO-RESTART

CROSS-REFERENCE TO RELATED APPLICATIONS

This application is a continuation-in-part of U.S. application Ser. No. 15/396,279, filed on Dec. 30, 2016, which is expressly incorporated by reference herein in its entirety.

TECHNICAL FIELD

The present technology pertains to software operation and processes on a computing device, and more specifically pertains to handling an unexpected shutdown of an application running on the computing device.

BACKGROUND

At any given moment, a client device may have several applications running. A user of the client device may be interacting with some of these applications while other applications may be running in the background. Occasionally, one or more of the applications may crash or otherwise unexpectedly shutdown without user instruction to do so. In some cases, the user may not know that an application has crashed and the user may assume that the application is still running. This may cause a bad user experience as the client device is not acting as expected by the user. Although the crashed application may be restarted, the manner in which the application is restarted may be confusing and/or distracting, depending on what the user is currently doing.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
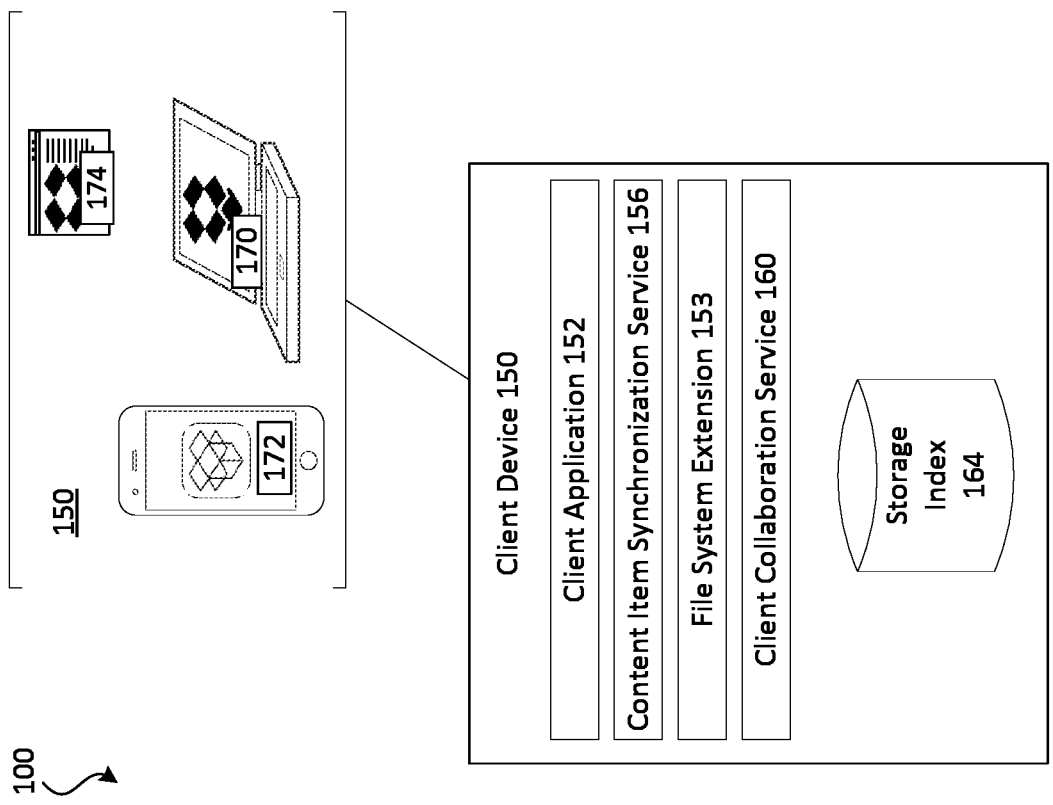
FIG. 1 shows an example of a content management system and client devices, in accordance with some embodiments.
Figure 1:
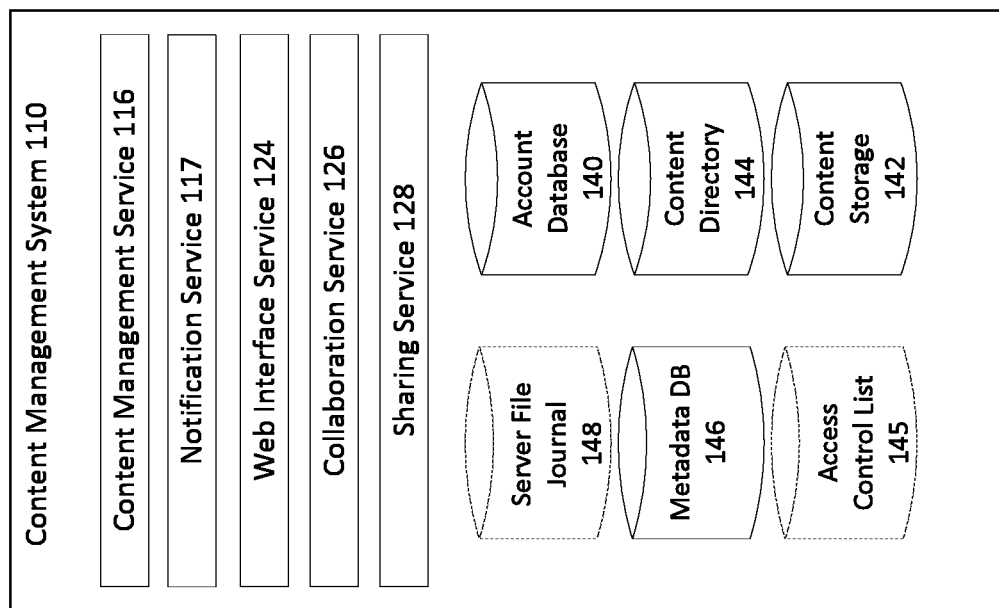

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

In many cases, an unexpected shutdown of an application running on a client device may interrupt the activities of a user and be a jarring, distracting, and confusing experience. In other cases such as when the application is running in the background where the user is not interacting with the application or even aware that is in running, the user may not even notice the unexpected shutdown of the application. However, even if the user is not aware of the unexpected shutdown of the application, the user may still be expecting the functions, features, or results provided by the application to exist. The lack of these functions, features, or results may also be jarring, unexpected, and a less than optimal user experience.

Aspects of the subject technology relate to handling an unexpected shutdown of an application running on a computing device in a manner that provides a more positive user experience. In particular, a system may be configured to restore operation of the application to a state expected by the user as quickly and intuitively as possible so as not to interrupt the activities of the user. This often times involves the restarting of the application in a non-disruptive manner while keeping the user informed as appropriate. For example, when the user is engaged with an application and the application crashes, the user may have been in the middle of something and interrupted by the crash. Accordingly, it may be desirable to automatically restart the application and provide the user with a communication (e.g., a notification, confirmation, or explanation) about the crash and how the situation has been resolved. This result may be aligned with user expectations and/or prevent user confusion and frustration. Alternatively, when the user is not engaged with the application, the user may not be aware of the crash and/or may not be affected by the crash. Accordingly, it may be desirable to automatically restart the application without a communication to the user that may interrupt or distract the user.

Various aspects of the subject technology provide for a system that enables the definition of various conditions and corresponding crash responses, the detection of those conditions, and the implementation of the appropriate crash response. For example, various flow profiles may be defined by a user, a developer, or other entity. Each flow profile may be associated with an application and include one or more user signals and logical operators (e.g., an AND operator, OR operator, NOT operator, etc.) that define the conditions associated with a flow. The flow may represent an intent, operation, or activity of the user that is associated with a particular application. The signals may be any information detectable by the application or the client device that is associated with a user's flow or other interaction between the user and the application.

The system may also monitor user signals over time that represents an operative flow or current state with respect to the user and the application. The system may compare the user signals associated with the operative flow with those of the one or more flow profiles and determine whether the operative flow matches a flow profile. If a match is found, the system may set an engagement status for the flow profile to active. If a match is not found, the system may set an engagement status for the flow profile to inactive. In the event of a crash of the application, the system can select a restart mode for the application based on the engagement statuses for the flow profiles and restart the application in accordance with the restart mode.

In some embodiments, the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users. Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications resident thereon. Client device 172 is a computing device wherein content items are only accessible to a specific application or by permission given by the specific application, and the content items are stored either in an application specific space or in the cloud. Client device 174 is any client device accessing content management system 110 via a web browser and accessing content items via a web interface. While example client devices 170, 172, and 174 are depicted in form factors such as a laptop, mobile device, or web browser, it should be understood that the descriptions thereof are not limited to devices of these example form factors. For example, a mobile device such as client 172 might have a local file system accessible by multiple applications resident thereon, or client 172 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 153 (which can be integrated with the local file system, or even the operating system kernel) can intercept read, write, copy, move, and delete commands relative to content items in the designated location of the file system of client device 150.

When file system extension 153 notices a write, move, copy, or delete command, it can notify content item synchronization service 156, which can synchronize the changes to content management system service 116. In some embodiments, content item synchronization service 156 can perform some functions of content management system service 116 including functions addressed above such as dividing the content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110. Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, or move of a content item recorded in server file journal 148 can trigger a notification to be sent to client device 150 using notification service 117. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

Collaboration service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments, this can be managed by requiring two users access a content item through a web interface and there they can work on the same copy of the content item at the same time.

Collaboration Companion Interface

In some embodiments, client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example, when client device 150 is a desktop or laptop computer, phone, television, internet-of-things device, etc. Alternatively or additionally, client device 150 can act on behalf of the user without the user having physical access to client device 150, for example, when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as a folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

In the context of FIG. 1, applications on the client device 150 that may crash and be automatically restarted may include, for example, client application 152, content item synchronization service 156, file system extension 153, client collaboration service 160, or other software running on client device 150. A user engagement aware auto-restart system may continuously monitor various signals detected by the applications and/or the client device. The set of signals for a particular time period may represent an operative flow of a user for that time period (e.g., a current or most recent time period).

The system may compare the current operative flow with one or more flow profiles and determine whether the operative flow matches a flow profile. If a match is found, the system may set an engagement status for the matching flow profile to an active state. If a match between the operative flow and a flow profile is not found, the system may set an engagement status for that flow profile to an inactive state. The current operative flow and the engagement statuses for flow profiles may be continuously updated over time as new signals are received and old signals become stale or no longer relevant. When the system detects a crash of the application, the system can identify the flow profiles with active engagement statuses, select a restart mode based on those flow profiles, and restart the application in accordance with the restart mode.

A user signal may represent an interaction between a user and an application. User signals may include input provided by a user to an application, an activity of the application, and/or a status of an application. For example, user signals can include application activity such as modifying an image or content item on a display, displaying a notification or dialog window within an open application, changing the state of a graphical user interface element such as blinking or changing color, modifying the status of indicators (e.g., a power or disk activity LED), emitting sound (e.g., music, speech, alerts, etc.), engaging actuators (e.g., moving a wheel, moving a camera into position, etc.), using resources (e.g., processor or network usage), etc. User signal can also include a status of an object of the application (e.g. a window being in focus, a variable being set or set with a specific value, etc.). User signal can also include user activity such as keypresses, mouse movements, mouse clicks, selections (e.g., using a touch-screen interface), voice input, body movement (e.g., to be recorded by a camera, etc.), etc.

In some embodiments, one or more user signals may be predicted even if not immediately detected. For example, a client application on the client device can determine a schedule for the user (e.g., based on the user's calendar or detected habits such as a sleep and/or work schedule) and the schedule can indicate that the user will likely engage or not engage with the client device or an application executing on the client device. For example, based on past engagement, a user might likely interact with a word processing application during the day and a web browser at night.

User signals may also include attempts by the client device to attract a user's attention. Examples of attracting attention include making a sound through a speaker, messaging the user's portable electronic device, presenting a notification (e.g., toast, pop-up, dialog-box/modal, contextual notification), highlighting or shading a GUI object, sending an email, etc. User signals can include providing output for the user (e.g., via audio, video, graphical user interface objects, etc.).

User signals may also include a graphical user interface associated with the relevant application process being open, active, or in focus (e.g., ready to receive user input, the top-most GUI element in an operating system, or having a focus characteristic). User signals can include a graphical user interface associated with the client application being the top-most user interface (e.g., window) of an operating system graphical user interface. User signals can include a user being present as determined by detecting a portable electronic device (such as client device 172 in FIG. 1) associated with the user being close to a personal computer (such as client device 170 in FIG. 1), by detecting the user via an input from a camera of client device 150, or by detecting activity associated with the respective user account, etc. User signals can also be based on active processes on the client device. For example, user signal can include a user initiating a synchronize or download operation using a content item synchronization service or scheduling a backup process. User signal can also be based resource usage (e.g., bandwidth, power, random access memory, processor resources, etc.) and whether the resource usage is above a threshold.

User signals can include a "camera upload" process including a device (e.g., a camera, phone, or external drive) being connected and a camera upload prompt being active and in focus. A camera upload process can include copying a file from the device and/or uploading content items to content management system 106. User signals can also include system tray or menu bar activity. For example, an icon associated with the client application can be visible, a cursor can hover over the icon (i.e., mouse over), a tooltip for the icon can be visible, etc. System tray or menu bar activity can include a tray (or menu) being open, the cursor hovering over the tray, and/or the tray being in focus. Other similar activity can include user clicking a menu item, a scroll operation through menu options, a selection of a menu option, etc.

User signals can also involve a sharing procedure. For example, user signal can include a sharing GUI object being open such as provided by client collaboration service 160 or client application 152 of FIG. 1, the sharing GUI object being in focus, the sharing GUI object being in the foreground, the sharing GUI object being selected, etc. User signal can involve a context menu being shown or a cursor hovering over the context menu. User signal can involve a user selecting a context menu option.

User signal can involve a GUI overlay such as the collaboration companion interface, described above. The GUI overlay can be placed on or adjacent to another application. User signals can include a cursor hovering on the GUI overlay. User signal can include the GUI overlay being active, being expanded, displaying comments, displaying a context menu, or receiving input.

A flow can be a set or sequence of one or more user signals. In some cases, a flow can be an ordered sequence of user signals. Example flows can include drafting an email, surfing the web, viewing settings, responding to a notification, interacting with a document or other content item, modifying settings, listening to music, sharing a content item with another user, etc. A flow can be associated with a single user signal or a combination of user signals. For example, a flow can include receiving a user's right click on a file, a client device displaying a context menu, receiving a selection of a share option, which closes the context menu, and ends the flow. Note, that the presentation of a sharing interface responsive to the received selection of the share option can initiate another flow.

A flow can also be associated with multiple non-simultaneous user signals, and this can include a record of past user interactions, which can include metadata such as timing values. An example of a flow with multiple non-simultaneous user signals is replying to an email. The associated user signals can include providing a notification of a received email, displaying an email-drafting window on a screen, receiving inputs from a user, and sending the reply email. This flow can exist in multiple states. The flow can first exist when the notification of a received email is provided. The flow can be updated to include the displaying of the email-drafting window. The flow can be further updated upon detecting that the email-drafting window is receiving inputs from a user. Finally, the flow can include the user signal of sending the email. Additionally, flows do not have to be mutually exclusive. For example, a user signal can be part of multiple different flows as described above in the example of a user engaging with a contextual menu and then engaging with a sharing interface, wherein the user signal is part of a contextual menu flow and a sharing flow. A flow can specify time periods or other contexts for the collection of user signals.

A flow profile can be a defined flow specifying one or more identifications of user signals that should generally not be interrupted with application updates. A flow profile can be a predetermined template of user signals, which can be used to identify times when a user is interacting with an application and should not be interrupted with an update. The identified user signals can be selected from possible user signals.

It should be understood that in addition to a collection or sequence of user signals, a flow profile can include relationships between user signals (e.g., a relative ordering of user signals, logical operators, etc.), timing between user signals, and a delay duration (e.g., an amount of time to delay before attempting to install after a flow profile match is determined). It should be understood that the amount of time can be the same between each user signal or can be different between different sets or sequences of user signals in a flow profile.

In some embodiments, a flow profile can include an expected duration of a user signal. For example, the system can determine a maximum duration to complete the user signals for the flow profile and set an associated expected duration accordingly. In some embodiments, the complexity of the associated user signals can inform the expected duration (e.g., simple tasks can have a shorter expected duration while more complex tasks can have a longer expected duration).

In some implementations, operative flows (and their constituent user signals) can be identified based on available flow profiles (and their constituent user signals). For example, an administrator can create various flow profiles, and a system can identify operative flows based on which user signals or user signal types are in those flow profiles.

A match between an operative flow and a flow profile can be defined in a variety of ways, and can even be flow profile specific. In some cases, a flow profile can specify an order or sequence among the multiple user signals. For these types of flow profiles an operative flow will match the flow profile when all or a threshold number of the operative flow user signals occur in the order or sequence specified in the flow profile. Alternatively, a flow profile can be an unordered set of one or more user signals. For these types of flow profiles an operative flow will match the flow profile when all or a threshold number of the operative flow user signals occur in the flow profile, regardless of order.

A flow profile can include match parameters that indicate the type of match required (e.g., exact, subset, subsequence), a threshold match value (e.g., percentage of matching user signals between the operative flow and the flow profile), and/or specific user signals that must match (e.g., user signals 1, 3, and 4 or user signals 1-3 of 6). A flow profile can also specify an end condition parameter to indicate that a flow is complete (e.g., a particular user signal, such as a window close action) or should no longer be considered a match (e.g., a maximum amount of time between specified user signals in a flow profile, which when exceeded, indicate the operative flow and the flow profile should no longer be considered a match). The flow profile parameters can be set in a variety of ways, such as manually by the flow profile definer or through statistical analysis (e.g., of user actions and/or install history).

Figure 2:
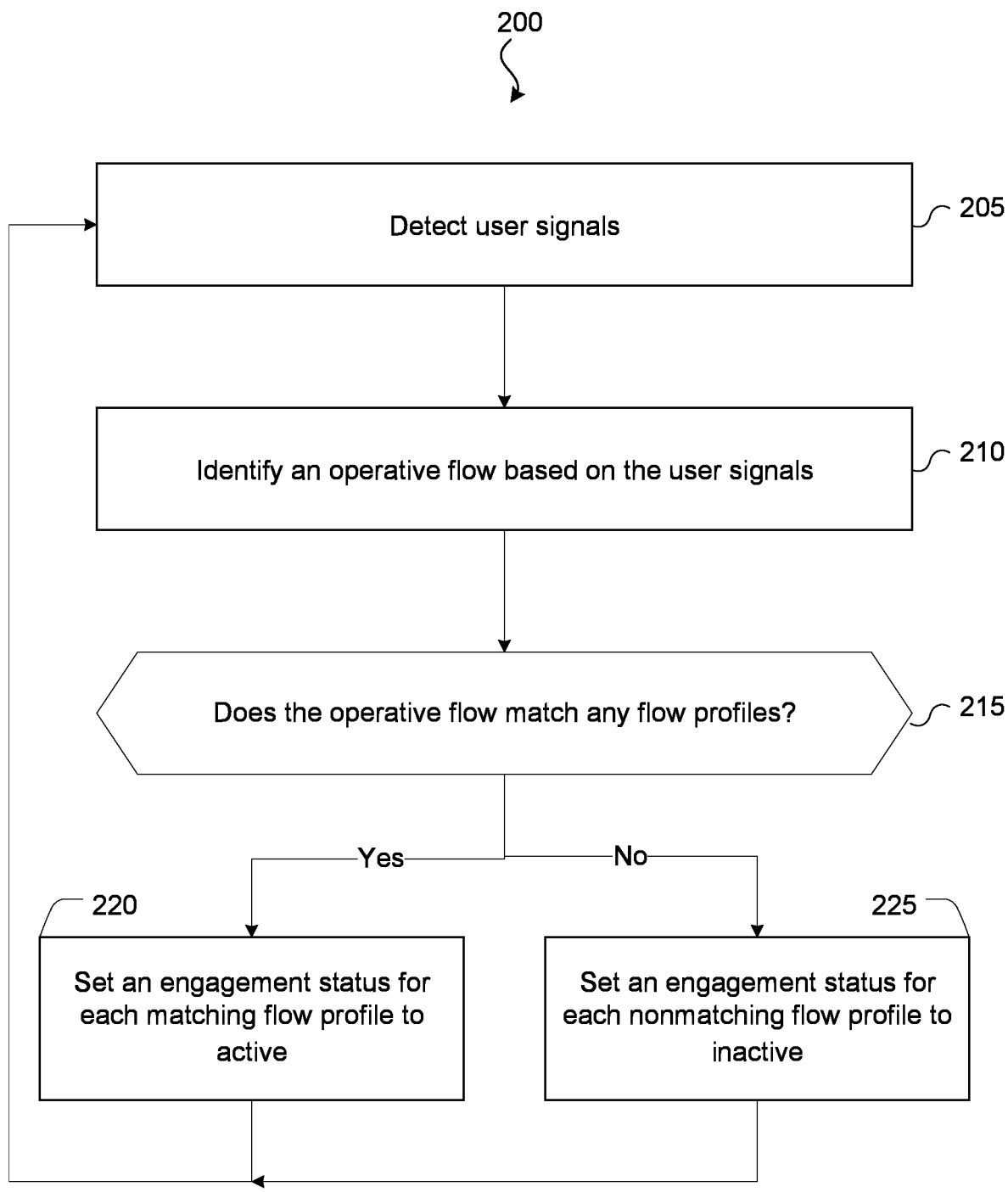
FIG. 2 shows an example method for setting an engagement status for a flow profile, in accordance with various embodiments of the subject technology.

FIG. 2 shows an example method 200 for setting an engagement status for a flow profile, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 200 may be implemented by a system such as, for example, a client device running one or more client applications. In particular, the method 200 may be implemented by one or more applications on the computing device such as a flow monitoring application or process. The client device may be, for example, a desktop or laptop computer, a mobile device, a set top box, a smart appliance, a virtual reality device, or any other application configured to aid a user in experiencing digital content.

At operation 205, the system may detect user signals associated with an application. In some embodiments, the client application may be associated with a content management system and be configured to synchronize content items with the content management system. For example, the client application may include client application 152, content item synchronization service 156, file system extension 153, or client collaboration service 160 of FIG. 1.

The user signals may be detected or received by a first application running on the system (e.g., client application 152, content item synchronization service 156, file system extension 153, or client collaboration service 160 of FIG. 1). The user signals or information regarding the user signals may be passed by the first application to a second application running on the system (e.g., a flow monitoring application) for analysis and/or further processing (e.g., performing the operations of FIG. 2 and FIG. 3). Alternatively or additionally, the user signals may be detected directly by the second application. In other embodiments, the first application itself may perform the signal analysis. As noted above, the user signals may include actions of the application, states or conditions associated with the application, conditions detected by the application, or actions of one or more users detected by the application, a separate flow monitoring application, or an operating system.

At operation 210, the system identifies an operative flow based on the user signals. The operative flow may represent a state of interaction between the user and the application. In some embodiments, the operative flow may be identified based on a set of user signals that were detected or otherwise associated during a particular period of time. The period of time may include, for example, a current time, the past 5 seconds, a most recent 3 minutes, or some other period of time. In particular, a current or recent time period may be used to identify a current operative flow for the application.

The operative flow may be compared to one or more flow profiles at operation 215 to determine whether the flow profiles are active or inactive. If the user signals in the operative flow are consistent with the requirements of a flow profile or otherwise match the conditions and/or user signals of the flow profile, that flow profile is considered to be active. Accordingly, at operation 220, the system may set the engagement status for the matching flow profile to active or an active state. On the other hand, if the user signals in the operative flow are not consistent with the requirements of a flow profile or otherwise do not match the conditions and/or user signals of the flow profile, that flow profile is considered to be inactive. Accordingly, at operation 225, the system may set the engagement status for the nonmatching flow profile to inactive or an inactive state.

The system may return to operation 205 to detect additional user signals or changes in users signals, update the operative flows, and update the engagement statuses for the available flow profiles on a continued basis in order to update information about the state of the various flow profiles.

Figure 3A:
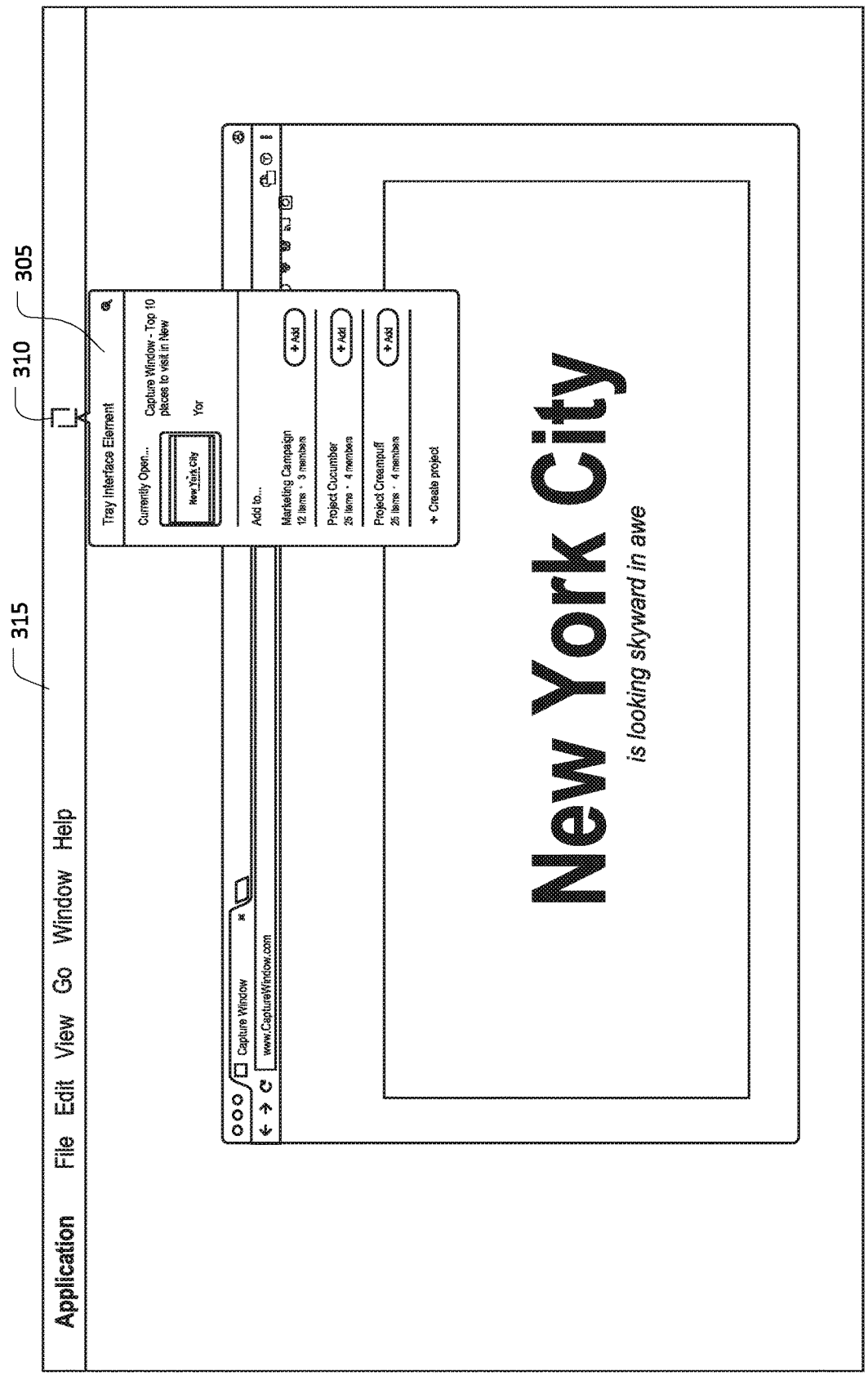
FIGS. 3A-3B show example graphical user interfaces capable of detecting user signals, in accordance with various embodiments of the subject technology.
Figure 3B:
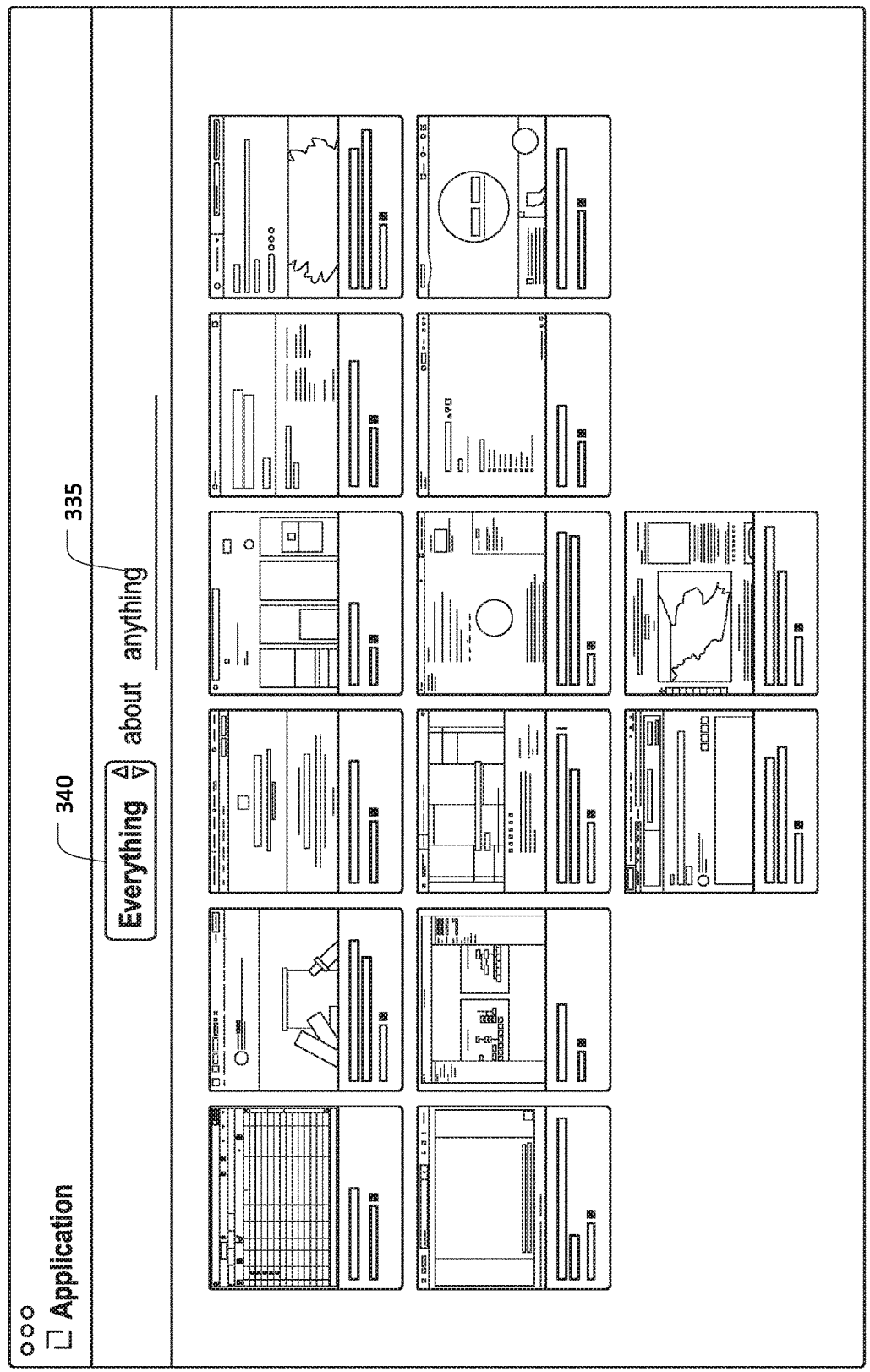

FIGS. 3A-3B show example graphical user interfaces capable of detecting user signals, in accordance with various embodiments of the subject technology. The graphical user interfaces may be displayed on a client device by a client application and include various interface elements capable of generating or detecting user signals. For the purposes of illustration, the client application and the graphical user interfaces shown in FIGS. 3A-3B may be configured to present digital content to a user, aid the user in experiencing digital content, and/or coordinate the management of content items with a content management system. However, other types of client applications and graphical user interfaces may also generate user signals.

For example, in FIG. 3A, graphical user interface 300 may include a tray interface element 305 that is associated with a client application running on the client device. The tray interface element 305 may be displayed in graphical user interface 200 in response to a user activating interface element 310 located on menu bar 315 or a task bar of graphical user interface 300. However, in other embodiments, tray interface element 305 may be displayed in other interface elements such as in a separate client application interface, in the client application associated with the active application content to be captured, or hidden from view.

In the example graphical user interface 300 displayed in FIG. 3A, user signals may be generated in response to a user selecting interface element 310 to display tray interface element 305, the tray interface element 305 being opened or displayed on the graphical user interface 300, the tray interface element 305 being active or in focus on the graphical user interface 300, a cursor hovering over the interface element 310 and/or the tray interface element 305, or any other condition detectable by the operating system or an application running on the client device. Flow profiles may be defined based on one or more of the user signals associated with the graphical user interface 300 (or other user signals). As an illustrative example, an "open tray" flow profile may require a user signal that specifies that the tray interface element 305 be displayed on the graphical user interface 300. Accordingly, the open tray flow profile may have an active engagement status when the tray interface element 305 is displayed on the graphical user interface 300 and an inactive engagement status when the tray interface element 305 is not displayed on the graphical user interface 300.

In FIG. 3B, graphical user interface 330 displays a collection of content items and includes a search interface 335 and a filter interface element 340. Using the filter interface element 340, a user may filter content items by project, application type, application name, creation date range, content type, or any other information available for the content items. Using the search interface 320, a user may search for desired one or more content items from the set of available active application content items based on, for example, a keyword.

In the example graphical user interface 330 displayed in FIG. 3B, user signals may be generated in response to a user selecting filter interface element 340 or search interface 335, a dropdown menu being displayed on the graphical user interface 330 in response to a selection of filter interface element 340, a cursor hovering over filter interface element 340 or search interface 335, a cursor active in search interface 335, text input entered into search interface 335, or any other condition detectable by the operating system or an application running on the client device. Flow profiles may similarly be defined based on one or more of the user signals associated with the graphical user interface 330 (or other user signals).

FIGS. 3A-3B are shown for illustrative purposes and user signals may be generated based on other types of interfaces as well. For example, user signals may be generated based on other input interfaces for entering comments for a content item, sharing content items with other users of a content management system, or otherwise entering input using an interface. Other user signals may be generated based on the state or action associated with an application. For example, user signals can include a "camera upload" process including a device (e.g., a camera, phone, or external drive) being connected and a camera upload prompt being active and in focus or a camera upload process being active. The camera upload process can include copying a file from the device and/or uploading content items to a content management system.

Various aspects of the subject technology also enable the system to provide a customized response to application crashes. For example, each flow profile may include or be associated with a specified crash response. The crash response may specify whether an application is to be restarted, how the application is to be restarted, and/or one or more operations to be performed by the application or on behalf of the application in response to the unexpected shutdown of the application and/or the restarting of the application.

For example, a crash response associated with a flow profile may specify that an application is to be restarted and display a notification configured to inform the user of the crash. Another crash response associated with another flow profile may specify that the application is to be restarted without a notification to the user. When the application crashes, a system may determine which flow profile is active and restart the application according to the crash response associated with the active flow profile.

The crash response may further specify a specific output to be provided by the application (e.g., a message, a sound or recording, an image, etc.) or in the notification or a sequence of operations to perform. The sequence of operations may include, for example, asking a user if they want to restore the state of the application to the last state recorded before the application crashed or to a fresh restart of the application. Alternatively, the sequence of operations may include providing the user with trouble shooting steps to take or incrementally walking the user through the trouble shooting steps.

In some cases where there are multiple available flow profiles, more than one flow profile may be active when an application crashes. The system may be configured to identify all active flow profiles when an application crashes, retrieve the crash responses for those active flow profiles, and restart the application based on the set of crash responses. In some embodiments, the flow profiles are associated with a priority value that indicates how the crash responses for those flow profiles should be prioritized by the system. For example, the crash response with the highest priority value may be selected for implementation from the other crash responses for active flow profiles.

Additionally or alternatively, the system may group together the crash responses for the active flow profiles. The grouping together of crash responses may include restarting one instance of the application and/or grouping together the messages associated with each of the crash responses into a single notification or message to the user. Each flow profile may also include a flag or other value indicating whether the crash response for the flow profile may be combined with other crash responses for other active flow profiles or specify which crash responses may be combined. In another embodiment, the crash responses with the three (or other number) highest priority values may be aggregated and implemented. For example, the system may aggregate the instructions in the crash responses for the highest priority flow profiles, remove duplicate instructions, and restart the application in accordance with the modified crash response.

Figure 4:
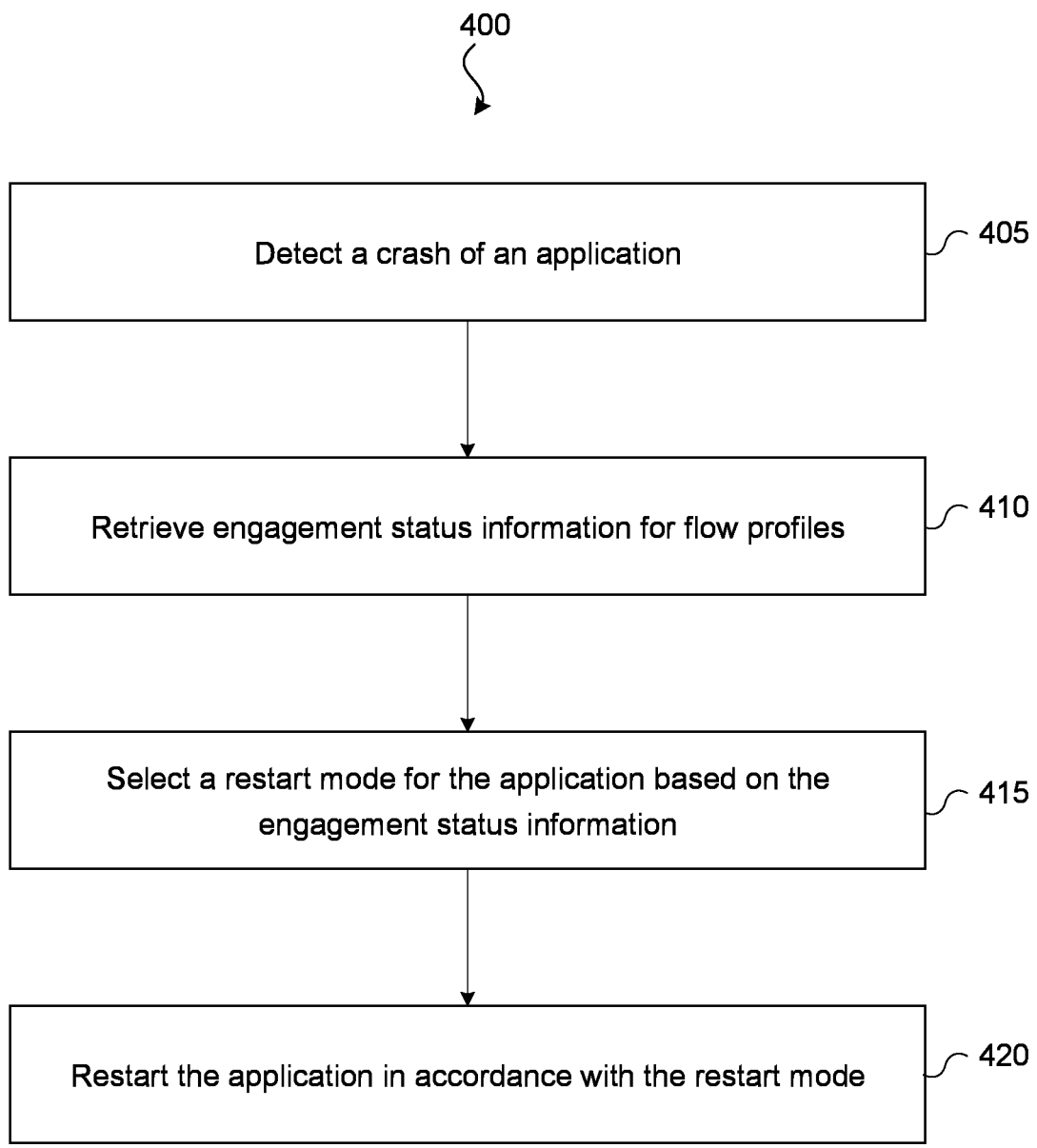
FIG. 4 shows an example method for responding to a crash of an application, in accordance with various embodiments of the subject technology.

FIG. 4 shows an example method 400 for responding to a crash of an application, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 400 may be implemented by a system such as, for example, a client device running one or more client applications. In particular, the method 400 may be implemented by one or more applications on the computing device such as a flow monitoring application or process.

At operation 405, the system detects the crash of an application. For example, a first application running on the system (e.g., client application 152, content item synchronization service 156, file system extension 153, or client collaboration service 160 of FIG. 1) may crash or unexpectedly shut down. This event may be detected by a second application running on the system (e.g., the flow monitoring application). As described with respect to FIG. 2, the engagement statuses for the various flow profiles associated with the application may be continually monitored and updated over time. At operation 410, the system retrieves the engagement status information for the flow profiles and selects a restart mode for the application based on the engagement status information at operation 415.

At operation 420, the system restarts the application in accordance with the restart mode. Restarting the application may involve passing various parameters to the application such that the application starts in accordance with the restart mode. Accordingly, the application will be able to determine what operations to perform upon restarting. The operations may include, notifying the user of the crash and/or restart, not notifying the user, transmitting a notification to a content management system or other third party regarding the crash and/or automatic restarting of the application, or any other operation associated with the restart mode.

Figure 5:
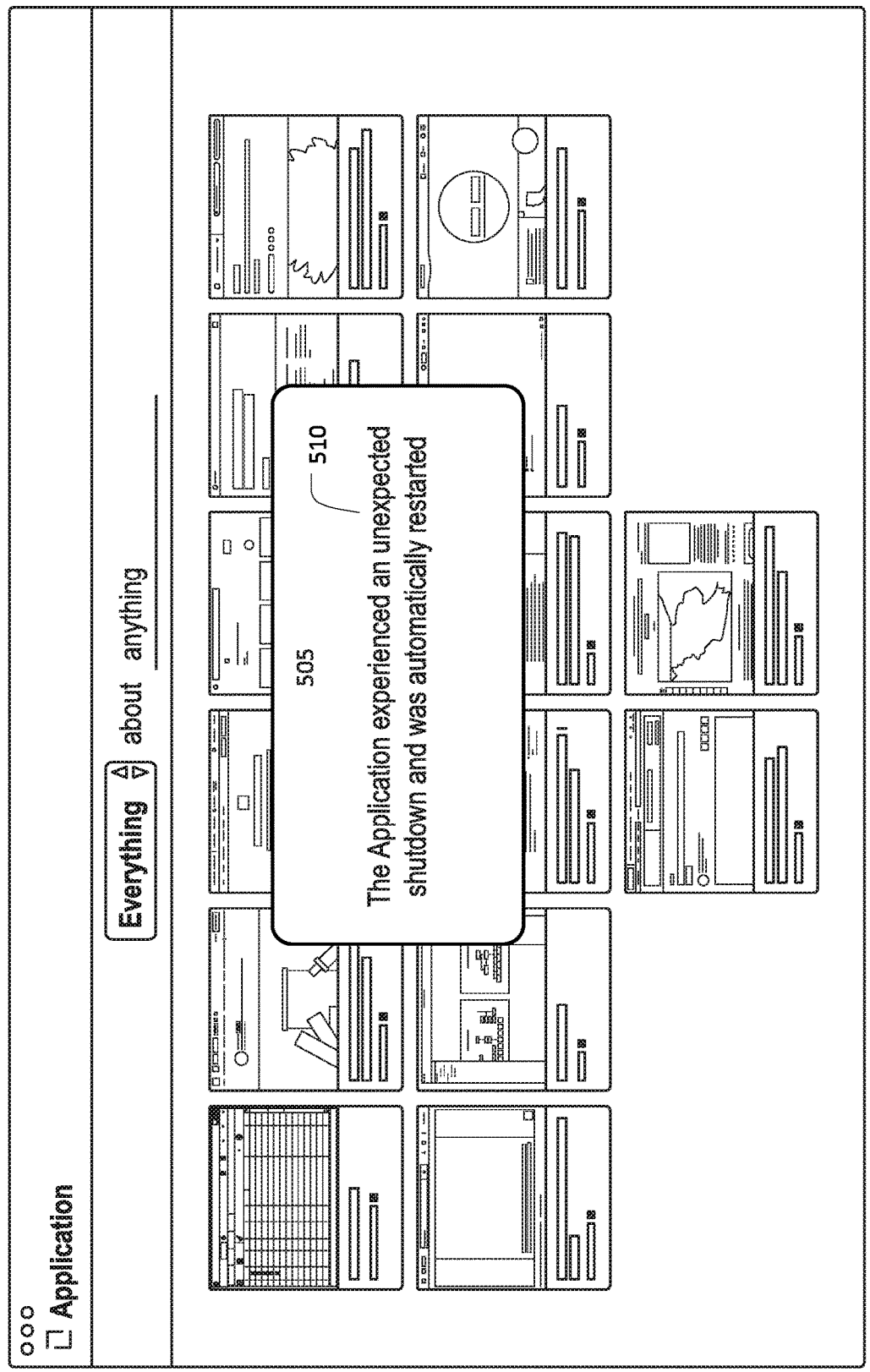
FIG. 5 shows an example graphical user interface illustrating a restart mode, in accordance with various embodiments of the subject technology.

FIG. 5 shows an example graphical user interface 500 illustrating a restart mode, in accordance with various embodiments of the subject technology. The graphical user interfaces may be displayed on a client device by a client application and include various interface elements capable of generating or detecting user signals. For the purposes of illustration, the client application and the graphical user interface shown in FIG. 5 is configured to present digital content to a user, aid the user in experiencing digital content, and/or coordinate the management content items with a content management system. However, other types of client applications and graphical user interfaces may also generate user signals.

When a crash of the client application is detected, engagement status information for flow profiles may be used to determine a restart mode and restart the client application in accordance with the restart mode. For example, an "active user" flow profile, a "open tray" flow profile, a "camera upload" flow profile, another flow profile, or a combination of flow profiles may have an active engagement status. Based on the one or more active engagement statuses, a restart mode is selected that specifies that a message 510 is to be provided via a notification 505 displayed on the graphical user interface 500 when the client application is restarted. The resulting graphical user interface 500 is illustrated in FIG. 5.

Although one specific message 510 is provided in FIG. 5 for illustrative purposes, the restart mode may specify different messages to be provided, the contents of the messages, and how the messages are to be provided (e.g., via notification 505, an audio output, visual indicators, etc.). For example, the message may be configured to inform the user of what type of crash the client application experienced, steps for the user to prevent future crashes, or other information about the crash. The message may further include options or actions that may be selected by the user. For example, the options may include one or more operations to be performed by the client application (e.g., restoring a previous view, opening the last accessed content item, continuing operations interrupted by the crash, etc.).

In another embodiment, if no flow profiles are associated with an active engagement status, all flow profiles are associated with an inactive engagement status, or a "non-engaged user" flow profile is associated with an active engagement status, a restart mode may be selected that indicates that no message or notification is to be provided.

As a result, the client application may be restarted in a non-disruptive manner while keeping the user informed as appropriate. For example, when the user is engaged with an application (e.g., one or more flow profiles are associated with an active engagement status) and the client application crashes, the user may have been in the middle of something and interrupted by the crash. Accordingly, the client application is automatically restarted and a message is provided to the user notifying the user about the crash and how the situation has been resolved. This result may be aligned with user expectations and/or prevent user confusion and frustration. Alternatively, when the user is not engaged with the application (e.g., no flow profiles are active, all flow profiles are inactive, or a "non-engaged user" flow profile is active), the user may not be aware of the crash and/or may not be affected by the crash. Accordingly, it may be desirable to automatically restart the application without a communication to the user that may interrupt or distract the user.

According to some embodiments, the system may also detect signals associated with a crash and/or restart event of an application. These signals may also be used in the flow profiles to determine a crash response for the application. For example, the signals detected by the system may also include a crash type, a crash count, a crash frequency, or other metadata and metrics associated with a crash event of the application. Crash type information may indicate what kind of issue caused a crash event of the application and/or whether or not the crash event is recoverable by an automatic restart or if further steps (e.g., installation of a new version of the application, configuration of settings, etc.) are necessary. In some embodiments, flow profiles associated with certain crash types may specify a crash response that includes not automatically restarting the application, notifying the user of certain steps that need to be taken in order to prevent further issues, restarting the application with a notification to the user, or a combination of different crash response elements. In a simple illustrative example, a flow profile may specify that if an application experiences a crash that is unrecoverable by simply restarting the application automatically, the system will not restart the application automatically.

In other embodiments, flow profiles may be configured to detect crash loops or frequent crashing of an application. For example, a flow profile may include a signal that includes a pattern of crashes or crashes of a certain type. The pattern may include, for example, one or more frequencies of crashes (e.g., more than twice in a one hour period or more than three times in a 24 hour period). If the pattern of crashes for an application matches the pattern of crashes in a flow profile and all other user signals (if any) are satisfied, the flow profile may be considered active and a subsequent crash may be handled based on a restart mode associated with the flow profile. In some cases, the restart mode may indicate that the application is not to be restarted. For example, if an application contains a bug and is unable operate correctly without more taking drastic measures (e.g., installing a new version or update to the application), restarting the application may not be helpful and may degrade the user experience instead. Accordingly, a flow profile may be configured to identify situations that cause repeated crashes and prevent the application from automatically restarting.

According to some embodiments, a client application running on a client device may interact with an external system that provides one or more services. For example, the client application may request one or more services (e.g., synchronization processes) provided by content management system 110 of FIG. 1 or a similar system. If a version of the client application containing a bug is distributed to a large number of client devices and the bug causes frequent crashes and automatic restarts of the client application, content management system 110 may receive a large number of requests for services that may cause response times or performance of content management system 110 to degrade.

Various aspects of the subject technology relate to a way for a content management system or other system providing services to a client device to control the number of requests it handles from client devices. The number of requests may be throttled or limited based on one or more throttling conditions. In order to provide an improved user experience, in some embodiments, manual starts of an application may be prioritized over automatic restarts of the application caused in response to a crash. For example, requests for service based on a manual starting of an application may be processed without throttling while requests for service associated with an automatic starting of an application may be processed in accordance with a throttling policy.

Figure 6:
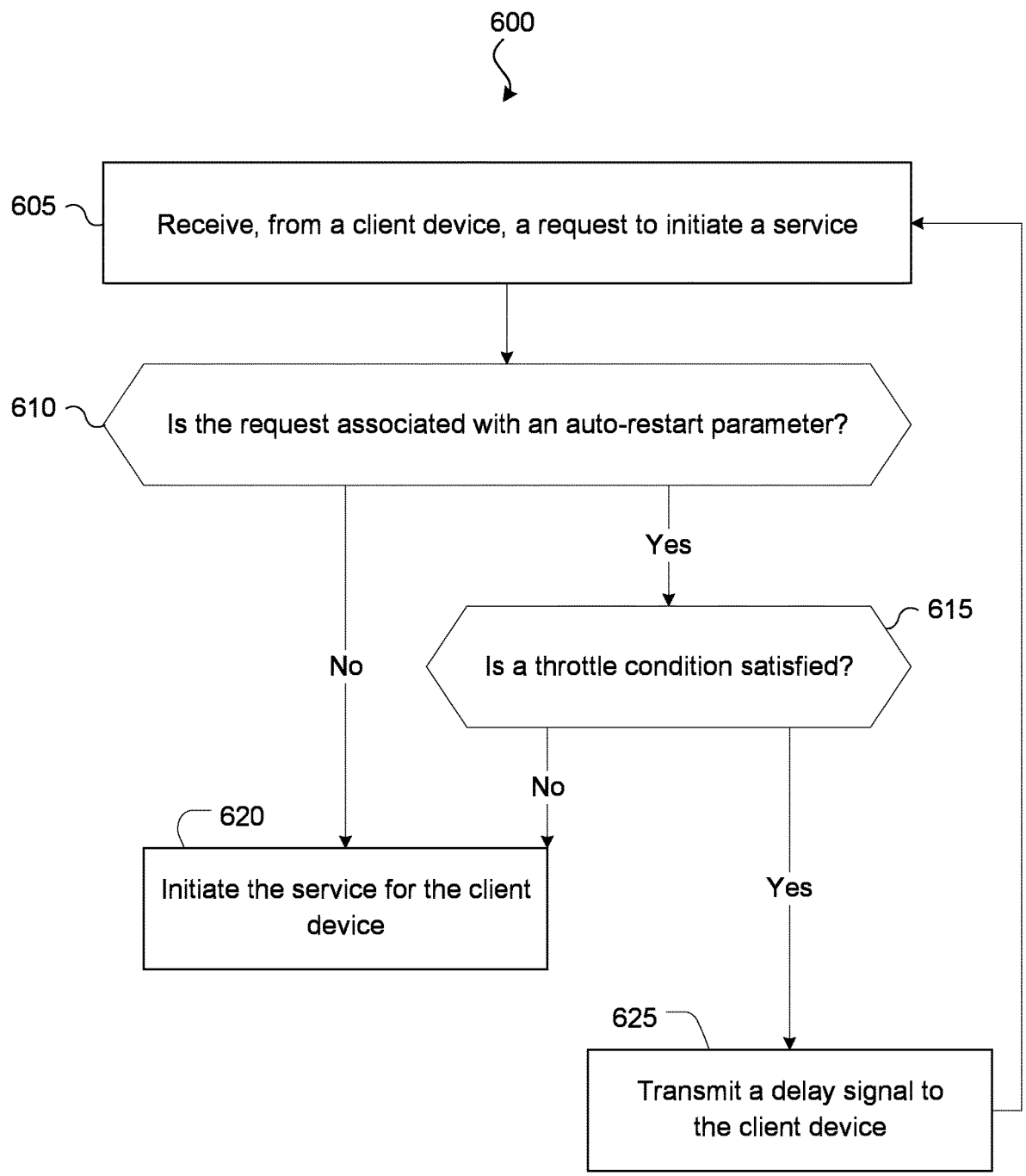
FIG. 6 shows an example method 600 for controlling requests for service from a client device, in accordance with various embodiments of the subject technology.

FIG. 6 shows an example method 600 for controlling requests for service from a client device, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 600 may be implemented by a system such as, for example, content management system 110 of FIG. 1 or other system providing services to the client device.

When a client application running on the client device starts up, it may send a request to initiate one or more services to the system. The request may be associated with or include a parameter (e.g., an auto-restart flag) that indicates whether the request to initiate the service is based on the manual starting of the client application by a user or based on an automatic restarting of the client application in response to a crash of the client application. At operation 605, the system may receive, from a client device, a request to initiate a service and determine whether the request is associated with an automatic restarting of the client application at operation 610.

If the request is not associated with the automatic restarting of the client application, this may indicate that the request is in response to a user manually starting the application. Accordingly, the system may initiate the service for the client device at operation 620. On the other hand, if the request is associated with the automatic restarting of the client application, the system may determine if a throttle condition is satisfied at operation 615. The throttle condition may include one or more thresholds or measures such as a number of requests for service received within a period of time, a number of requests associated with restarts received within a period of time, an available or used bandwidth level, an available or used compute level, an average response time, or any other detectable metric. These metrics may be continuously monitored and updated.

If the throttle condition is not satisfied, the system may initiate the service for the client device at operation 620. If the throttle condition is satisfied, at operation 625, the system may transmit a delay signal to the client device. In response to receiving the delay signal, the client application at the client device may wait for a period of time and resend the request to initiate a service after the period of time has elapsed. The period of time may be specified by the system in the delay signal sent to the client device or be a default period of time.

Figure 7:
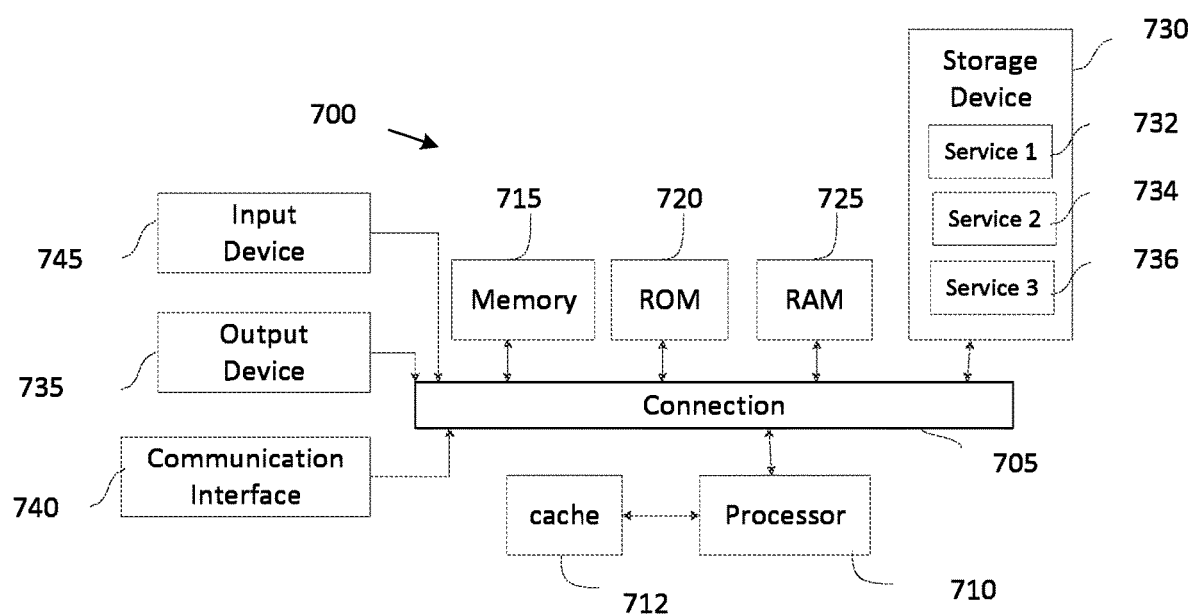
FIG. 7 shows an example of a system for implementing certain aspects of the present technology.

FIG. 7 shows an example of computing system 700 in which the components of the system are in communication with each other using connection 705. Connection 705 can be a physical connection via a bus, or a direct connection into processor 710, such as in chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) and random access memory (RAM) to processor 710. Computing system 700 can include a cache of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware, and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising: identifying an operative flow comprising signals associated with an application, wherein the signals comprise user and system signals;
   accessing stored flow profiles and match parameters for the flow profiles that indicate the type of match required for each flow profile, wherein two or more of the match parameters have different match types;
   determining that the operative flow matches a flow profile of the one or more flow profiles for the application when the respective match parameter is satisfied between the signals associated with the operative flow and flow profile signals in the flow profile;
   setting, in response to determining whether the operative flow matches the flow profile, an engagement status for the flow profile;
   detecting a crash of the application;
   selecting, in response to detecting the crash of the application, a restart mode for the application based on the engagement status for the flow profile from two or more different restart modes; and
   restarting the application in accordance with the selected restart mode.

2. The computer-implemented method of claim 1, wherein one or more of the user signals are predicted and not immediately detected.

3. The computer-implemented method of claim 1, wherein one or more of the user signals are attempts by the application to attract a user's attention.

4. The computer-implemented method of claim 1, further comprising:
   identifying all active flow profiles when the application crashes;
   retrieving crash responses for those active flow profiles; and
   restarting the application based on the set of crash responses.

5. The computer-implemented method of claim 1, wherein the application is a content management application configured to coordinate synchronization of content items with a content management system.

6. The computer-implemented method of claim 1, further comprising:
   providing an option to manually define the flow profiles and the match parameters.

7. The computer-implemented method of claim 1, wherein the match parameters include a match parameter for a relationship match between user signals of each flow profile or a match parameter for a non-sequential threshold match with respect to user signals of an operative flow.

8. The computer-implemented method of claim 1, further comprising:
   identifying, in response to restarting the application in accordance with the selected restart mode, a second operative flow comprising second signals associated with the application;
   determining whether the second operative flow matches a second flow profile for the application, wherein the second flow profile includes a crash frequency, and wherein matching the second operative flow and the second flow profile is based on a match in the crash frequency;
   setting, in response to determining whether the second operative flow matches the second flow profile, a second engagement status for the second flow profile;
   detecting a second crash of the application;
   selecting, in response to detecting the second crash, a second restart mode for the application based on the second engagement status for the second flow profile; and
   restarting the application in accordance with the second restart mode.

9. The computer-implemented method of claim 1, further comprising:
   detecting a change in the operative flow; and
   updating the engagement status for the flow profile based on the change in the operative flow.

10. The computer-implemented method of claim 1, further comprising:
    transmitting, to a content management system, a request to initiate synchronization processes for content items, wherein the request includes an auto-restart parameter indicating that the application has been automatically restarted.

11. The computer-implemented method of claim 10, further comprising:
    receiving, from the content management system, a delay signal in response to a throttle threshold of the content management system being exceeded;
    waiting, in response to the delay signal, for a period of time; and
    resending, after the period of time, the request to initiate synchronization processes for content items.

12. A non-transitory computer readable medium storing instructions, the instruction, which when executed by a computing system, cause the computing system to perform operations comprising:
    accessing stored flow profiles and match parameters for the flow profiles that indicate the type of match required for each flow profile, wherein two or more of the match parameters have different match types;

identifying a first operative flow comprising first signals associated with an application, wherein the first signals comprise user and system signals;
determining that the first operative flow matches a first flow profile for the application when the respective match parameter is satisfied between the first signals and first flow profile signals of the first flow profile;
setting, in response to the first operative flow matching the first flow profile, a first engagement status for the first flow profile to active;
detecting a first crash of the application running on the computing system;
selecting, in response to detecting the first crash of the application, a first crash response for the application based on the first engagement status from two or more different crash responses, wherein the first crash response comprises instructions for responding to the first crash;
and implementing the instructions of the first crash response.

13. The non-transitory computer readable medium of claim 12, wherein matching the first operative flow and the first flow profile is based on a match in sequence between the first signals and the first flow profile signals such that there is at least a threshold percentage of sequentially matching signals between the first signals and first flow profile signals.

14. The non-transitory computer readable medium of claim 13, wherein the instructions further cause the computing system to perform operations comprising:
determining that the first operative flow does not match a second flow profile; and
setting, in response to the first operative flow not matching the second flow profile, a second engagement status for the second flow profile to inactive.

15. A system comprising:
one or more processors; and
a non-transitory computer readable medium storing instructions that, when executed by the one or more processors, cause the system to perform operations comprising:
accessing stored flow profiles and match parameters for the flow profiles that indicate the type of match required for each flow profile, wherein two or more of the match parameters have different match types;
identifying a first operative flow comprising one or more first signals, wherein the one or more first signals comprise user and/or system signals;
determining that the first operative flow matches a first flow profile of the one or more flow profiles when the respective match parameter is satisfied between the one or more first signals and first flow profile signals of the first flow profile;
setting, in response to determining whether the first operative flow matches the first flow profile, a first engagement status for the first flow profile;
selecting a first restart mode for an application based on the first engagement status for the first flow profile from two or more different restart modes; and
responding to a first crash of the application in accordance with the first restart mode.

16. The system of claim 15, wherein the operations further comprise detecting the first crash of the application.

17. The system of claim 15, wherein the application is a content management application configured to coordinate synchronization of content items with a content management system.

18. The system of claim 15, wherein the operations further comprise:
detecting a change in the first operative flow; and
updating the first engagement status for the first flow profile based on the change in the first operative flow.

19. The system of claim 15, wherein the operations further comprise transmitting, to a content management system, a request to initiate synchronization processes for content items, wherein the request includes an auto-restart parameter indicating that the application has been automatically restarted.

20. The system of claim 19, wherein the operations further comprise:
receiving, from the content management system, a delay signal in response to a throttle threshold of the content management system being exceeded;
waiting, in response to the delay signal, for a period of time; and
resending, after the period of time, the request to initiate synchronization processes for content items.

* * * * *